United States Patent
Creswick

(10) Patent No.: US 6,627,825 B1
(45) Date of Patent: Sep. 30, 2003

(54) HYDRAULIC WEIGHING APPARATUS AND METHOD

(75) Inventor: Richard Creswick, New South Wales (AU)

(73) Assignee: TEK Solutions Pty Ltd, New South Wales (AU)

( * ) Notice: Subject to any disclaimer, the term of this patent is extended or adjusted under 35 U.S.C. 154(b) by 0 days.

(21) Appl. No.: 09/868,979

(22) PCT Filed: Dec. 21, 1999

(86) PCT No.: PCT/AU99/01160
§ 371 (c)(1),
(2), (4) Date: Sep. 27, 2001

(87) PCT Pub. No.: WO00/37899
PCT Pub. Date: Jun. 29, 2000

(30) Foreign Application Priority Data

Dec. 21, 1998 (AU) .............................................. PP 7851

(51) Int. Cl.⁷ .............................................. G01G 19/10
(52) U.S. Cl. ...................... 177/141; 177/146; 177/208; 177/254; 73/862.454; 73/862.582
(58) Field of Search ................................ 177/141, 208, 177/209, 254, 146; 73/862.454, 862.581, 862.582, 862.583, 862.584

(56) References Cited

U.S. PATENT DOCUMENTS

| | | | | |
|---|---|---|---|---|
| 4,691,792 A | * | 9/1987 | Shintani ..................... | 177/141 |
| 5,178,226 A | * | 1/1993 | Bowman et al. ............ | 177/141 |
| 5,509,293 A | | 4/1996 | Karumanchi ................. | 177/141 |
| 5,606,516 A | * | 2/1997 | Douglas et al. ............. | 177/208 |
| 5,666,295 A | * | 9/1997 | Bruns ......................... | 177/141 |

FOREIGN PATENT DOCUMENTS

| WO | WO 87/00270 | 1/1987 |
|---|---|---|
| WO | WO 92/05409 | 4/1992 |

* cited by examiner

Primary Examiner—Randy Gibson
(74) Attorney, Agent, or Firm—Carol M. LaSalle; Bozicevic, Field & Francis LLP

(57) ABSTRACT

A hydraulic lifting and weighing system particularly for refuse collection vehicles and the like and includes means for dynamically weighing garbage. The system includes a hydraulic actuator operable to move a lifting arm and takes two measurements of the pressure of the hydraulic fluid in the system as the arm raises a waste bin whose weight is to be measured. The weight of the bin is calculated by multiplying the pressure by a factor determined by calibration with known weights. Weights are calculated based on the measurements of pressure and the result averaged. The system compensates for variations in hydraulic flow characteristics. The system includes means for compensating for variations in the inclination of the vehicle.

21 Claims, 1 Drawing Sheet

HYDRAULIC WEIGHING APPARATUS AND METHOD

FIELD OF THE INVENTION

This invention relates to a hydraulic weighing apparatus and method. In particular, the invention relates to an apparatus and method for dynamic weighing, in which the weight to be measured is moved by a hydraulic cylinder, a rotary actuator, or the like, and in particular, to such a method and apparatus for use in weighing commercial and/or domestic waste 1. Background of the Invention Waste or refuse is produced by both domestic households and commercial organisations. The service of waste removal is commonly carried out by municipal councils, particularly in the case of domestic households. In some arenas, waste is also collected by commercial organisations often acting on behalf of municipal councils. Most domestic households, pay a fixed rate for disposal of refuse which is independent of the amount of refuse the household produces. However, as councils become increasingly concerned about the environment, the cost of landfill, and the need to encourage people to recycle more household waste, attention is now being paid to reducing the amount of refuse households provide and to encourage them to recycle as much of their waste as possible. Further, governments are putting pressure oil councils to reduce the amount of waste that goes to landfill. This can only be achieved by separating recyclable material and biodegradable materials that previously went to landfill, from waste. Thus, many municipal councils are now considering introducing incentive schemes where residents pay for the refuse collection service and have weight limits.

Most industrial weighing systems operate using a load cell which is mounted on a structural member and the deformation of the member is used to calculate the weight of the object. However, static weighing is much too slow for use in a waste collection environment, since such technology, and other weighing technology requires a set period of time to perform the weighing function. This would increase the time required to complete the waste collection service and would be unacceptable in terms of efficiency. Thus, any practical weighing system for use in waste management must be able to weigh dynamically whilst the waste is actually being loaded onto a refuse collection vehicle.

Although dynamic weighing systems have been proposed, most of these systems are unreliable and inaccurate often because they fail to compensate for variables in the weighing process.

It is an object of the present invention to provide an apparatus and method which alleviates the problems of the prior art and enables dynamic weighing of waste bins and the like within acceptable degrees of accuracy.

2. Summary of the Invention

Thus according to the present invention, there is provided a hydraulic lifting system/apparatus comprising a lifting arm, frame or the like adapted to carry a load whose weight is to be measured, the arm or frame being moved by a hydraulic actuator means such as a hydraulically operated piston and cylinder arrangement, or a rotary actuator or the like, operable to cause the arm to move due to the flow of hydraulic fluid into or out of the hydraulic actuator means, including a first pressure sensing means for measuring the pressure of the hydraulic fluid in the system, and characterised by means for determining changes in the flow characteristics of the hydraulic fluid and means for calculating the weight of the load based on the pressure measurements made by the first pressure sensing means while compensating for changes in flow characteristics as measured by the means for determining changes in the flow characteristics In a preferred embodiment, the means for determining changes in the flow characteristics include an orifice disposed in the hydraulic line. The first pressure sensing means is disposed on one side of the orifice. A second pressure sensing means is disposed on the opposite side of the orifice. The measurements from the first and second pressure can be used to calculate a pressure differential across the orifice. The kinematic viscosity of the hydraulic fluid is related to the pressure differential either side of the orifice plate. Knowledge of the kinematic viscosity of the hydraulic fluid can be used to compensate for changes in hydraulic fluid flow characteristics (which are primarily brought about by an increase in temperature) which would otherwise affect the accuracy of the weight measurement. Variations of as much as 300% in the measured value of the weight could occur between weight measurements made when the hydraulic fluid is cold and measurements made when the hydraulic fluid has reached its normal working temperature, if no account is taken of changes in flow characteristics.

Typically, each pressure sensing means will make a series of pressure measurements each defining a sequence of pressure measurements which can be used to produce an average pressure measurement for each pressure sensing means.

Another potential source of changes in flow rate, arise from the use of valves to operate lifting members. If the valve is not fully opened by the operator, variations in flow rate each time the arm is lifted, will occur.

In an alternative embodiment, instead of the orifice, the apparatus includes a temperature sensor. As the hydraulic fluid warms up its kinematic viscosity decreases and it becomes more free flowing. The temperature of the oil can be used to indirectly calculate changes in flow characteristics. However pressure difference measurement is preferable as it is more accurate and responsive than calculating theoretical changes due to temperature changes.

The apparatus may incorporate both the orifice and the temperature sensor.

In one embodiment, a hydraulic pump which pumps fluid to the hydraulic actuator to move the lifting arm operates at a constant volume flow rate during most of the movement of the arm, except for the periods when the arm stops and starts moving. The pressure measurements made by the first and second pressure sensing means are taken between two set points in most cases, while volume flow rate is theoretically constant and the arm is ideally travelling at a constant velocity, thus obviating the requirement for any accelerometer or other means for measuring the acceleration of the arm.

However, for hydraulic flows which provide non-uniform movement between the two sensors, an accelerometer could be used to detect that non-uniform movement and this information could be imported into the main calculation.

However, a constant flow rate pump is not essential and it is possible to calculate flow rate and variations in flow rate from measurements of the time it takes the lifting arm to move a set distance.

It is preferred that the apparatus includes a means for measuring the time it takes for the lifting device to move between the two set points. The time taken for the arm to move between the two points gives the flow rate. Corrections can be made to account for any variations in the normally constant velocity of the lifting arm.

The system of the present invention is particularly suitable for use on waste collection vehicles, however it could also be used on other hydraulic lifting apparatus such as forklifts. It will be appreciated that existing waste collection vehicles can be simply converted to the system of the present invention by for example, simply placing an orifice and pressure sensors into the vehicle's hydraulic line plus other sensors including temperature sensors if desired, and link them to appropriate control and calculation means.

The system simply uses the existing hydraulics of the vehicle and it is not necessary to fit load cells or other weight sensing devices to the lifting mechanism to make weight measurements. Thus, the system of the present invention can be implemented relatively simply and without major mechanical modifications.

The system also preferably includes level measurement apparatus which is adapted to compensate for variations in the attitude of the base frame to which the lifting arm is attached which would affect the measured weight.

The invention also encompasses a method of dynamically weighing a load carried on a lifting member moved by a hydraulic actuator, the hydraulic actuator being operable to cause the lifting member to move due to the flow of hydraulic fluid into or out of the hydraulic actuator means, comprising the steps of, during the lifting of the weight by the lifting member;

measuring the pressure of the hydraulic fluid in the system using a first pressure sensor;

measuring variations in flow characteristics of the hydraulic fluid in the system;

calculating the weight of the load based on the pressure measured by the first pressure sensors, the calculating step including compensating for variations in flow characteristics of hydraulic fluid.

In one embodiment the step of measuring variations in the flow characteristics includes the step of;

measuring the pressure of the hydraulic fluid in the system using a second pressure sensor, wherein the first and second sensors are disposed either side of an orifice in the hydraulic line and calculating the pressure differential across the orifice.

BRIEF DESCRIPTION OF THE DRAWING

A specific embodiment of the present invention will now be described by way of example only and with reference to the accompanying FIG. 1 which is a schematic representation of apparatus embodying the present invention.

DETAILED DESCRIPTION OF A PREFERRED EMBODIMENT

Figure 1:
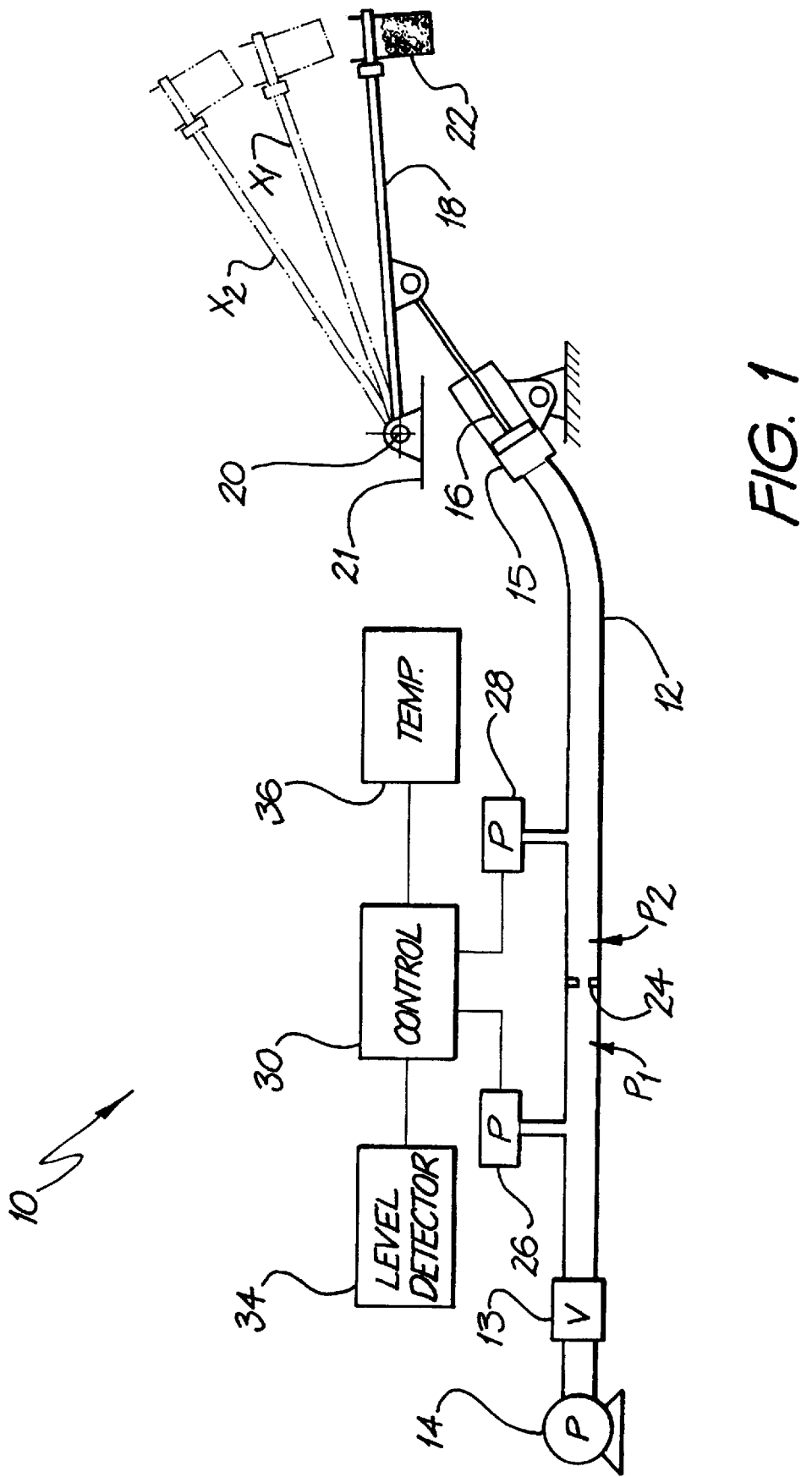

Referring to the drawing, FIG. 1 shows a schematic diagram of a dynamic weight measuring apparatus embodying the present invention 10. The Figure is not to scale.

The apparatus includes a pump 14, which supplies hydraulic fluid, typically an oil, via a control valve 13 and the flow line 12 to a hydraulic cylinder 15 and piston 16 arrangement which is operatively connected to a lifting arm 18. The pump may be, but is not necessarily, a constant volume flow rate pump. One end of the arm is mounted on a pivot 20 and the other end carries a garbage bin or the like 22. Clearly movement of the piston 16 in cylinder 15 causes the arm 18 to rotate about the pivot 20 lifting or lowering the bin 22. The cylinder and piston could be replaced by a rotary actuator in an alternative embodiment. The arm is carried on a base frame schematically represented by the line 21 which should ordinarily be horizontally oriented.

There is an orifice 24 disposed in the hydraulic line 12 between the cylinder 15 and the pump 14. Pressure transducers 26, 28 are disposed in the line either side of the orifice 24 and produce electrical signals dependent on the pressures P1 and P2 either side of the orifice 24. The pressure transducers 26, 28 are operatively connected to a control means 30 which includes a processor means.

The system may also include a temperature sensor 36 which measures the temperature of the hydraulic fluid.

When the lifting arm 18 is operated to lift the garbage 22 and the position of the operator of the vehicle incorporating the system will open the control valve 13 to supply hydraulic fluid to the cylinder for lifting. Often, in practice, the operator will not open the valve fully. The lifting arm 18 moves about an arc, whose centre is the pivot 20. The arm moves between two positions X1 and X2 illustrated in phantom in the Figure. The time t it takes the arm to rotate through positions X1 and X2 depends on the flow rate of the hydraulic fluid through the pump 14 and the position of the operator's control valve. The time t taken to move between those two points is measured. If any variations occur in the time t, corrections can be made to the measured weight to make allowances for changes in flow rate of the hydraulic fluid. Variations in the system dependent on the different loads lifted show up in the pressures measured by transducers 26, 28.

The system has to compensate for circumstances which affect accurate measurements of the weight. Thus, the apparatus includes level measurement means 34 which measures the lateral and longitudinal orientation angle of the base frame 21 of the vehicle/lifting apparatus and can thus compensate for differences in the weight of the garbage caused by the vehicle being on a slope.

The weight can then be calculated by multiplying the voltage value given by the pressure transducer 26 by a multiplier G1 which is obtained through calibrating the apparatus with known weights. The calculated weight is adjusted to compensate for differences in the flow characteristics of the hydraulic oil and the orientation/angle of the vehicle as measured by the level measurement means 34.

The weight W is generally given by the following equation.

$$W = G_1 * P_2 \left(1 + k_1(P_2 - P_1) + k_2 \frac{1}{\cos \cdot x} + k_3 \frac{1}{\cos \cdot y}\right)$$

$P_2$ is the pressure measured by the second pressure sensor (may be an averaged value).

x is the longitudinal or forward angle of inclination of the base frame from the horizontal.

y is the lateral or sideways inclination of the base frame from the horizontal.

$k_1, k_2, k_3$ are multiples.

Because the system weighs by sensing the pressure of the oil in the hydraulic system, vibrations can be compensated for by compression of the oil.

A further important feature of the invention is that because variations in the flow characteristics and flow rate are compensated for, inaccuracies such as the operator's valve being only partly open. Hydraulic fluid leaks in the system also are compensated for automatically, since the system measures the pressure of the hydraulic fluid.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A hydraulic lifting and weighing apparatus for dynamically measuring the weight of a load, the apparatus comprising:
   a lifting member adapted to carry a load whose weight is to be measured, the lifting member being movable by a hydraulic actuator means operable to cause the lifting member to move due to the flow of hydraulic fluid into or out of the hydraulic actuator means,
   a first pressure sensing means and a second pressure sensing means for measuring the pressure of the hydraulic fluid in the apparatus,
   an orifice disposed in a hydraulic line carrying the hydraulic fluid to create a pressure differential between the first pressure sensing means and a second pressure sensing means,
   means for determining changes in the flow characteristics of the hydraulic fluid, and
   means for calculating the weight of the load based on the pressure measurements made by the first pressure sensing means while compensating for changes in flow characteristics as measured by the means for determining changes in the flow characteristics.

2. The hydraulic lifting and weighing apparatus of claim 1 wherein each pressure sensing means makes a series of pressure measurements which are used to produce an average pressure measurement for each pressure sensing means.

3. The hydraulic lifting and weighing apparatus of claim 1 wherein the lifting member is a lifting arm.

4. The hydraulic lifting and weighing apparatus of claim 1 wherein the lifting member is a frame.

5. The hydraulic lifting and weighing apparatus of claim 1 wherein the hydraulic actuator means is a hydraulic cylinder.

6. The hydraulic lifting and weighing apparatus of claim 1 wherein the hydraulic actuator means is a rotary actuator.

7. The hydraulic lifting and weighing apparatus of claim 1 further comprising a temperature sensor and processing means for calculating changes in flow characteristics due to temperature changes.

8. The hydraulic lifting and weighing apparatus of claim 1 further comprising a hydraulic pump which pumps fluid to the hydraulic actuator to move the lifting member except for the periods when the lifting member stops and starts moving, and wherein the pressure measurements made by the first and second pressure sensing means are taken between two set points while the lifting member is traveling at a constant speed.

9. The hydraulic lifting and weighing apparatus of claim 8 further comprising a means for measuring the time taken for the lifting member to move between the two set points to enable corrections to be made to account for any variations in the normally constant velocity of the lifting member.

10. The hydraulic lifting and weighing apparatus of claim 1 including level measurement apparatus which are adapted to compensate for variations in the attitude of the lifting arm which would affect the weight measured by the apparatus.

11. A vehicle incorporating a hydraulic lifting and weighing apparatus as claimed in claim 1.

12. The vehicle of claim 11 wherein the vehicle is a refuse collection vehicle.

13. The vehicle of claim 11 wherein the vehicle is a forklift truck.

14. A method of dynamically weighing a load carried on a lifting member moved by a hydraulic actuator, the hydraulic actuator being operable to cause the lifting member to move due to the flow of hydraulic fluid into or out of the hydraulic actuator, said method comprising the steps of, during the lifting of the weight by the lifting member:
   measuring the pressure of the hydraulic fluid through a hydraulic flow line using a first pressure and second sensors disposed on opposing sides of an orifice in the hydraulic flow line;
   measuring variations in the flow characteristics of the hydraulic fluid; and
   calculating the weight of the load based on the pressure measured by the first and second pressure sensors, the calculating step including compensating for variations in the flow characteristics of the hydraulic fluid.

15. The method claim 14 wherein the step of measuring the pressure using the pressure sensors comprises making a series of pressure measurements and averaging the pressure measurements for each pressure sensor.

16. The method of claim 15 further comprising the step of measuring the temperature and processing the temperature measurements for calculating changes in the flow characteristics of the hydraulic fluid due to temperature changes.

17. The A method of claim 16 wherein the pressure measurements made by the first and second pressure sensors are taken between two set points while the volume flow rate of hydraulic fluid is theoretically constant in that the lifting member is traveling at a constant velocity.

18. The method of claim 14 further including the step of measuring the time for the lifting member to move between the two set points to enable corrections to be made to account for any variations in the constant velocity of the lifting member.

19. The method of claim 14 further including the step of compensating for variations in the attitude in the lifting member.

20. The hydraulic lifting and weighing apparatus of claim 2 further comprising a temperature sensor and processing means for indirectly calculating changes in flow characteristics due to temperature changes.

21. The method of claim 17 further comprising the step of measuring the time for the lifting member to move between the two set points to enable corrections to be made to account for any variations in the constant velocity of the lifting member.

* * * * *